UNITED STATES PATENT OFFICE.

JOHANN BEHRENS, OF BREMEN, GERMANY.

PROCESS OF MANUFACTURING ACETIC ACID.

SPECIFICATION forming part of Letters Patent No. 667,358, dated February 5, 1901.

Application filed April 30, 1900. Serial No. 14,980. (No specimens.)

*To all whom it may concern:*

Be it known that I, JOHANN BEHRENS, a subject of the German Emperor, residing at the city of Bremen, in the German Empire, have invented a certain new and useful Process of Manufacturing Acetic Acid, of which the following is a specification, such as will enable others skilled in the art to which it appertains to perform the same.

In manufacturing acetic acid by the decomposition of acetate of lime by means of sulfuric acid the following objects have to be aimed at: quantitative yield of acetic acid, production of acetic acid of the highest possible strength, consumption of only the theoretical quantity of sulfuric acid, easy separation of the calcium sulfate from the acetic acid, and avoidance of collateral reactions. The solution of this problem has been attempted in various ways. According to the old processes (Descharmes, Prückner) the pyrolignate of lime is dissolved in water, decomposed by sulfuric acid, and the acetic acid formed either decanted or distilled off. Collateral reactions are avoided thereby, and the yield is nearly quantitative. These processes have the disadvantage that the precipitated calcium sulfate immediately becomes hydrated and makes the mixture stiff, so that the separation of the acetic acid in both cases presents great difficulties, while the addition of a larger quantity of water to reduce the consistency lowers the strength of the acid too much. Another method described in the specification for the English Patent No. 22,817 of 1892 is based upon the distillation of acetates with sodium bisulfate, with addition of water or diluted acetic acid, whereby acetic acid and two neutral salts are formed. The strength of the acid obtained by this method also is not sufficiently high to permit a practical application of this method. According to the process at present generally used the acetate of lime is decomposed in a heated vessel provided with stirrers by means of sulfuric acid of 66° Baumé. The tarry substances contained in the acetate of lime at the high temperature of distillation required have a reducing action on the sulfuric acid, of which a large excess must be employed, and in consequence a considerable quantity of sulfurous acid is formed. Besides this the yield of acetic acid always remains considerably below the theoretical quantity, and a loss through collateral reactions, especially the formation of acetone and empyreumatic substances, is unavoidable. These drawbacks cannot be obviated in all cases even by the use of a vacuum.

My improved process fulfils all the requirements named above without having any drawbacks worth mentioning. The method is based upon the following considerations: The requirements named can only be fulfilled by a wet precipitation of the calcium sulfate; but in order to employ the smallest possible quantity of solvent the consolidation of the mass of gypsum by hydration is to be avoided. This again can only then succeed if the concentration of the acetic acid used as solvent is sufficiently high to abstract water from the gypsum, and consequently prevent its hydration. For this reason and also in order to obtain a crude acid of high percentage of strength acetic acid of at least sixty per cent. strength must be used. If in this way the acetate of lime is dissolved in concentrated acetic acid and sulfuric acid slowly added while stirring, the mixture remains liquid until the theoretical quantity of sulfuric acid has been added; but with a small excess of sulfuric acid it suddenly consolidates, as the very dilute sulfuric acid has a hydrating action upon the gypsum even in the presence of concentrated acetic acid, as has been ascertained by experiments. When the excess of sulfuric acid is neutralized by the addition of acetate of lime, the mass, conforming with the theory, at once becomes liquid again, the gypsum parting with its water to the acetic acid. The excess of sulfuric acid, however, only has the hydrating action when it is dilute, the acetic acid in this case acting as diluting agent.

My improved process based upon the above alterations is characterized as follows: Into one part of acetic acid of at least sixty per cent. strength, but preferably of higher percentage, one part of dry acetate of lime (commercial article of eighty-two per cent.) is mixed; but it need not be completely dissolved for the further operation. While stirring, the theoretically-sufficient quantity of sulfuric acid is slowly added—that is to say, 0.55 parts of sulfuric acid of ninety-two per cent. $H_2SO_4$. The temperature is without influence upon the decomposition or consistency of the mass. Artificial heating is therefore omitted. The separation of the liquid gypsum and acetic-acid mass can be effected by directly distilling off the acetic acid further through pressing the mass or removing the acetic acid by suction. The acetic acid obtained is free from calcium sulfate, as this is insoluble in concentrated acetic acid.

The advantages of my process are: the greatest almost quantitative yield of acetic acid, production of acetic acid of a very high percentage of strength, consumption of only the theoretical quantity of sulfuric acid, convenient separation of the calcium sulfate from the acetic acid, and avoidance of collateral reactions. It further allows the employment of impure acetate of lime, such as the brown acetate of lime, as well as the employment of Nordhausen acid instead of the ordinary sulfuric acid of 66° Baumé, in order to further increase the concentration of the acetic acid, which is excluded with the process hitherto used in consequence of the strong collateral reactions. With the use of Nordhausen acid it even becomes possible with the improved process to obtain directly glacial acetic acid, as the excess $SO_3$ of the Nordhausen acid combines with the moisture of the acetate of lime to form sulfuric-acid monohydrate.

I am aware that another process (protected by the American Patent No. 432,926) also endeavors to obtain a thin fluid mass of gypsum and acetic acid by avoiding the hydrating of the calcium sulfate precipitated from an aqueous or weak acetic-acid solution. This method, however, differs from mine in that with it the precipitation of the calcium sulfate free from water of hydration is a consequence solely of the expressly-emphasized high temperature of the solution, while according to my improved process the result is obtained in an entirely-different manner by the power of the concentrated acetic acid to abstract water, for as, according to the statement in the said American specification, one part of sulfuric acid is diluted with two parts of water, the calculation proves that the concentration of the acetic acid produced can never attain the sixty per cent. $C_2H_4O_2$ required by my process.

Having now particularly described and ascertained the nature of my said invention and in what manner the same is to be performed, I declare that what I claim is—

1. The hereinbefore-described process of manufacturing acetic acid which consists in dissolving acetate of lime in acetic acid, decomposing the resultant by sulfuric acid, and separating the acetic acid from the other ingredients.

2. The hereinbefore-described process of manufacturing acetic acid which consists in dissolving acetate of lime in acetic acid, decomposing the resultant by sulfuric acid and separating the acetic acid from the precipitated calcium sulfate.

3. The hereinbefore-described process of manufacturing acetic acid which consists in dissolving acetate of lime in acetic acid of not less than sixty per cent. (60%) strength, mixing therewith sulfuric acid, and separating the acetic acid.

In testimony that I claim the foregoing as my invention I have signed my name in presence of two subscribing witnesses.

JOH. BEHRENS.

Witnesses:
  E. A. BEHRENS,
  H. HAGERMAND.